Aug. 15, 1933.  W. J. HOGREFE ET AL  1,922,292
DEVICE TO CONTROL WRAPPING TWINE
Filed Dec. 19, 1929  2 Sheets-Sheet 1
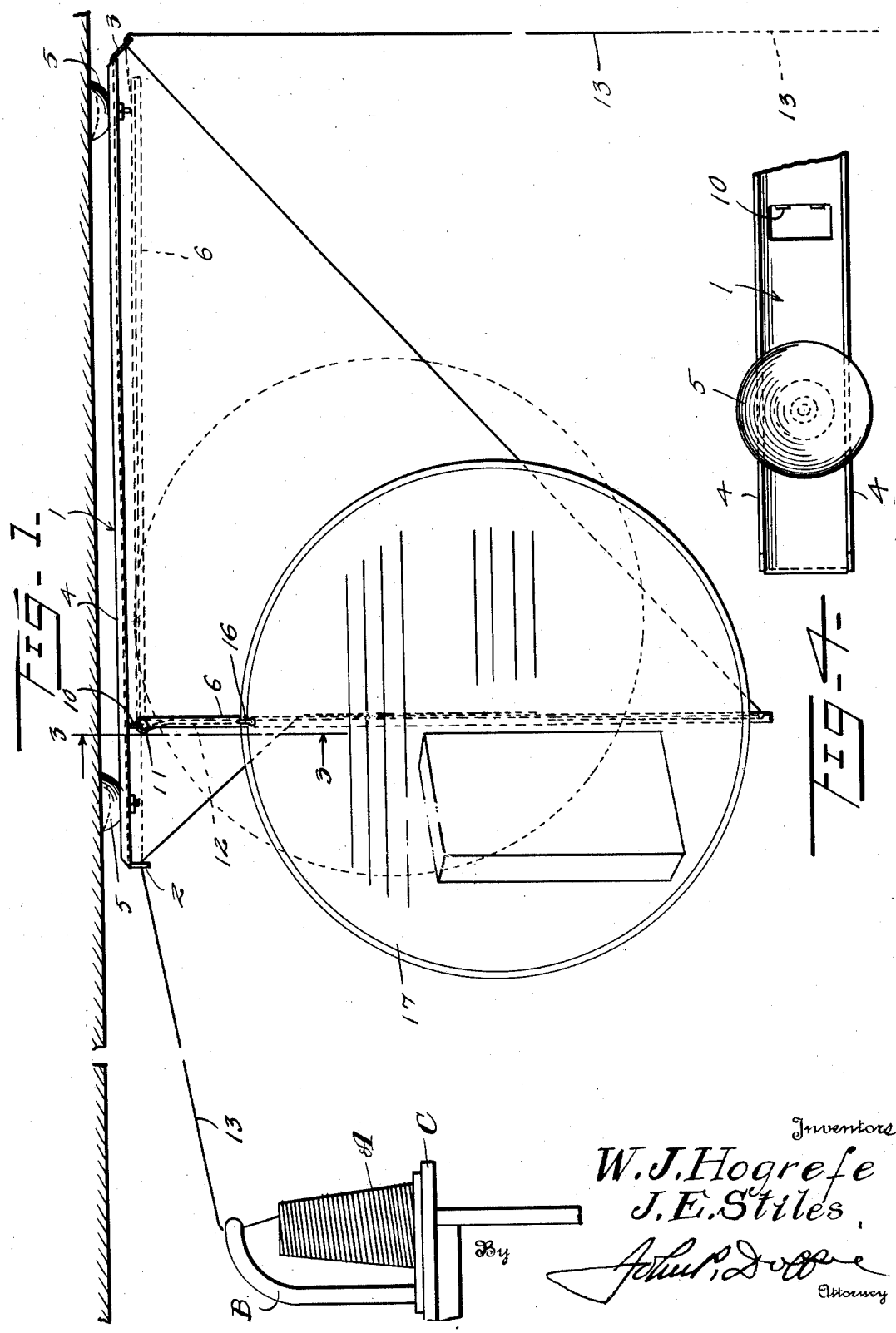
Inventors
W. J. Hogrefe
J. E. Stiles
Attorney

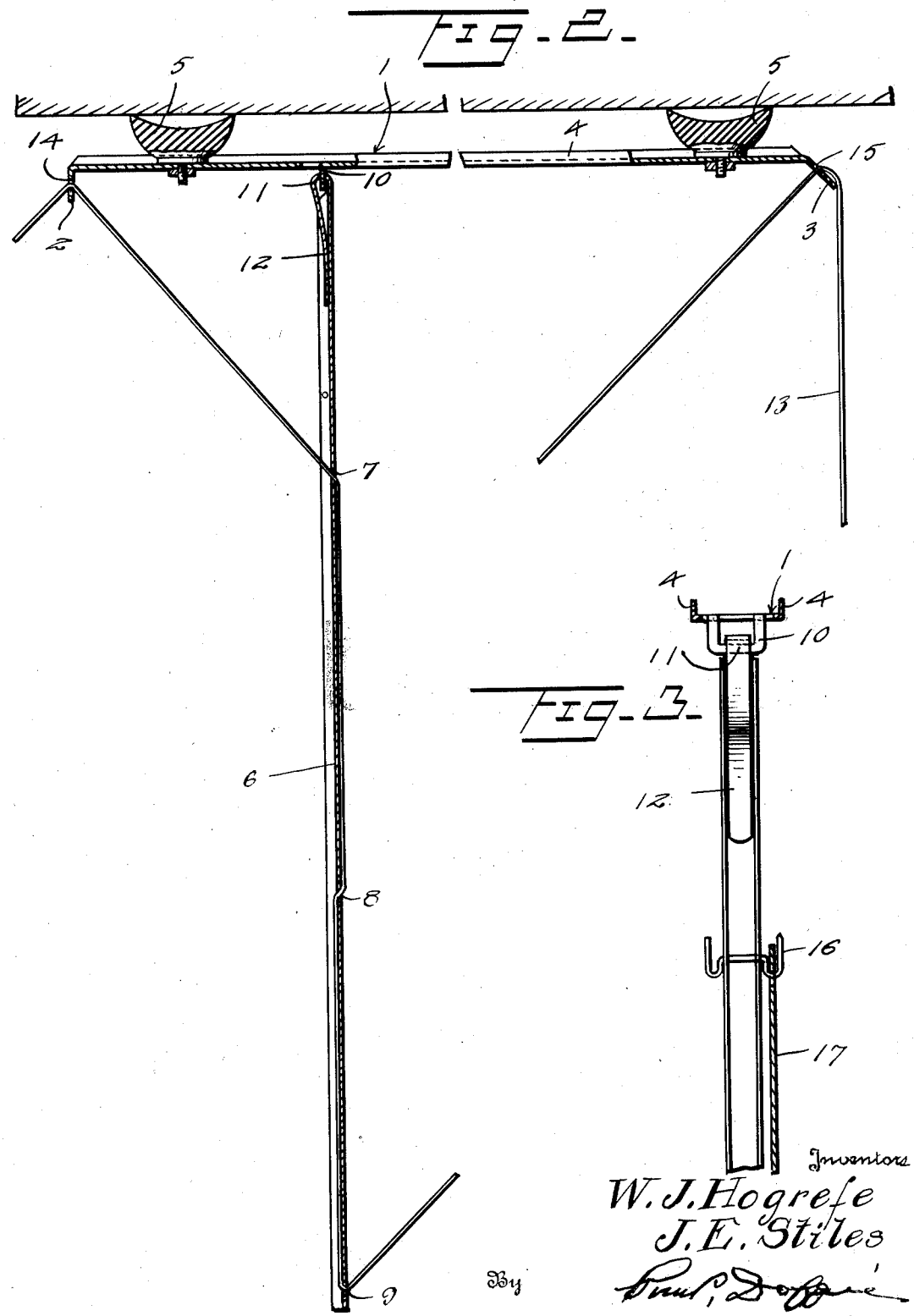

Patented Aug. 15, 1933

1,922,292

UNITED STATES PATENT OFFICE 1,922,292

DEVICE TO CONTROL WRAPPING TWINE

William J. Hogrefe and Jot E. Stiles, Sacramento, Calif.

Application December 19, 1929. Serial No. 415,301

1 Claim. (Cl. 242—141)

This invention relates to new and useful improvements in a device to control wrapping twine. The device prevents the twine from unrolling and at the same time keeps the twine in a desired out-of-the-way position and eliminates the liability of the same being covered up by promiscuous goods piled on the counter and carried away with parcels hastily picked up by the purchaser.

The primary object of the invention is to provide a device of this kind that may be used as an advertising medium as well as a useful fixture for any store using twine to wrap packages. The device may be used to great advantage by national advertised products manufacturers of food, candy, soft drinks and drug products.

The device is simple and economical in construction and may be made of metal or other suitable material and in any size or dimensions desired.

With the foregoing and other objects in view that will appear as the nature of the invention is better understood, the same consists in the novel features of construction, combination and arrangement of parts illustrated in the accompanying drawings and more particularly pointed out in the appended claim.

In the accompanying drawings, which are for illustrative purposes only and are therefore not drawn to scale:

Figure 1 is a front elevation, illustrating the application of the invention, the full lines indicating the normal position of the pendulum-like twine controlling bar and the dotted lines the horizontal raised position of said bar.

Figure 2 is a vertical longitudinal fragmentary section, with the parts represented on an enlarged scale.

Figure 3 is a detail vertical transverse section, taken on the plane indicated by the dotted lines 3—3 of Figure 1 and Figure 4 is an enlarged detail fragmentary plan view of one end of the pendulum supporting bar.

Referring to the drawings for a more particular description of the invention and in which drawings like parts are designated by like reference characters throughout the several views, A designates the cone of twine carried by the twine holder B, which may be placed in a suitable out-of-the-way position on the counter (not shown) or on the shelf C back of the merchandise. Specifically, the present device comprises a straight horizontal pendulum supporting bar 1, formed at one end with the right-angularly bent depending ear 2 and at its opposite end with the outwardly and downwardly inclined ear 3. The supporting bar may be provided with upwardly extending parallel side flanges 4 and has removably secured to opposite ends thereof the rubber suction cups 5, whereby said bar may be supported from the ceiling, wall or other support.

A pendulum-like twine controlling bar 6 is pivotally suspended in normal perpendicular position from one end of the supporting bar 1 and is formed in its body portion with a series of transverse longitudinally spaced openings 7, 8 and 9, respectively, the purpose of which will presently appear. The twine controlling bar 6 is preferably connected with the supporting bar 1 by the depending eye and the loop 10 and 11, respectively, the former being struck out from the metal from which the supporting bar is made and the latter being formed by inserting the tongue 12 through the eye 10 and then bending the tongue backwardly against the inner face and upper end of the twine controlling bar.

In carrying out the invention, the free end 13 of the twine is first threaded through a transverse opening 14 in the depending ear 2 of the supporting bar 1, thence alternately in opposite directions through the transverse openings 7, 8 and 9 in the pendulum-like twine controlling bar 6 and finally through the transverse opening 15 in the ear 3 and allowed to hang or suspend over the counter at a convenient place for wrapping the packages of merchandise purchased.

In practice, by pulling on the free end of the twine preparatory to wrapping a bundle, the pendulum-like twine controlling bar 6 is first swung from its normal full line perpendicular position to the horizontal dotted line position indicated in Figure 1 of the drawings, when a continued pull on the twine will result in the desired amount being obtained to wrap the package of goods purchased by the customer. When the package is wrapped, the free end of the twine is released and the twine controlling bar 6 will automatically swing back into its normal perpendicular position by force of gravity and raise the free end of the twine a suitable distance above the counter, but in convenient reach of the clerk in proceeding to wrap the next package. The method employed of threading the free end of the twine through the transverse openings in the bar 6 provides the desired tension on the twine to raise the free end of the twine from the counter when said bar swings back into normal perpendicular position.

The upper end of the twine controlling bar 6 is provided with a hook or catch 16 from which a card or label 17 bearing suitable advertising matter (or other object) may be suspended.

From the foregoing description taken in connection with the drawings, it is thought that the construction, operation and advantages of the invention will be readily understood without requiring a more extended explanation.

Various changes in the form, proportions and minor details of construction may be resorted to without departing from the principles or sacrificing any of the advantages of the invention as defined in the appended claim.

Having described the invention, what is claimed as new and desired to secure by Letters Patent, is:

A device to control wrapping twine, comprising a horizontal stationary supporting bar mounted beneath the ceiling or other support, a pendulum-like twine controlling bar, pivotally supported from one end of the stationary supporting bar and provided in its body portion with diagonal slots disposed alternately in opposite directions and through which the free end of the twine is passed and depending ears situated at opposite ends of the supporting bar and provided with transverse openings through which the twine is passed before and after passing through the slots in the twine controlling bar.

WILLIAM J. HOGREFE.
JOT E. STILES.